(12) United States Patent
Deishi

(10) Patent No.: US 8,055,780 B2
(45) Date of Patent: Nov. 8, 2011

(54) METHOD OF MANAGING INFORMATION AND INFORMATION PROCESSING APPARATUS

(75) Inventor: Satoshi Deishi, Ibaraki (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1098 days.

(21) Appl. No.: 11/899,342

(22) Filed: Sep. 5, 2007

(65) Prior Publication Data

US 2008/0065778 A1  Mar. 13, 2008

(30) Foreign Application Priority Data

Sep. 12, 2006  (JP) ................................. 2006-246473

(51) Int. Cl.
*G06F 15/16* (2006.01)
(52) U.S. Cl. ......... 709/229; 709/224; 709/225; 709/226
(58) Field of Classification Search .......... 709/224–226, 709/229
See application file for complete search history.

(56) References Cited

U.S. PATENT DOCUMENTS

| | | | |
|---|---|---|---|
| 6,715,073 B1 * | 3/2004 | An et al. ....................... | 713/156 |
| 7,058,619 B2 * | 6/2006 | Wanish ................................ | 1/1 |
| 2003/0212888 A1 * | 11/2003 | Wildish et al. ................. | 713/158 |
| 2006/0129804 A1 * | 6/2006 | Satkunanathan et al. ..... | 713/156 |
| 2008/0034204 A1 * | 2/2008 | Lakshminarayanan ....... | 713/158 |
| 2009/0187761 A1 * | 7/2009 | Campbell et al. ............. | 713/156 |

FOREIGN PATENT DOCUMENTS

| | | |
|---|---|---|
| JP | 2001-36521 A | 2/2001 |
| JP | 2001-77809 A | 2/2001 |
| JP | 2002-217899 A | 8/2002 |
| JP | 2004-185263 A | 7/2004 |

OTHER PUBLICATIONS

R. Housley et al, "Internet X.509 Public Key Infrastructure Certificate and CRL Profile", IETF RFC2459, Network Working Group, Jan. 1999, pp. 1-114.
T. Dierks et al, "The TLS Protocol Version 1.0", IETF RFC2246, Network Working Group, Jan. 1999, pp. 1-80.
A. O. Freier, "The SSL Protocol Version 3.0", Transport Layer Security Working Group, rfc_draft302, Internet-Draft, Nov. 18, 1996, pp. 1-50.

* cited by examiner

*Primary Examiner* — Moustafa M Meky
*Assistant Examiner* — Sahera Halim
(74) *Attorney, Agent, or Firm* — Sidley Austin LLP

(57) ABSTRACT

In a network composed of a plurality of nodes wherein the nodes verify mutually and can communicate directly each other, when a certificate is revoked due to withdrawal of a node, the revoking node transmits a withdrawal notice to all the other existing nodes which can be connected directly and promotes them to update the connection tables and revocation lists held by the respective nodes.

5 Claims, 15 Drawing Sheets

| HOST NAME | IP ADDRESS | MAC ADDRESS |
|---|---|---|
| PC2 | 192.168.0.112 | 00-11-22-33-44-02 |
| PC9 | 192.168.0.119 | 00-11-22-33-44-09 |

TL2(TL)

| HOST NAME | IP ADDRESS | MAC ADDRESS |
|---|---|---|
| PC1 | 192.168.0.111 | 00-11-22-33-44-01 |
| PC3 | 192.168.0.113 | 00-11-22-33-44-03 |
| PC4 | 192.168.0.114 | 00-11-22-33-44-04 |
| PC7 | 192.168.0.117 | 00-11-22-33-44-07 |

TL6(TL)

| HOST NAME | IP ADDRESS | MAC ADDRESS |
|---|---|---|
| PC3 | 192.168.0.113 | 00-11-22-33-44-03 |
| PC5 | 192.168.0.115 | 00-11-22-33-44-05 |
| PC7 | 192.168.0.117 | 00-11-22-33-44-07 |
| PC8 | 192.168.0.118 | 00-11-22-33-44-08 |

TL7(TL)

| HOST NAME | IP ADDRESS | MAC ADDRESS |
|---|---|---|
| PC2 | 192.168.0.112 | 00-11-22-33-44-02 |
| PC6 | 192.168.0.116 | 00-11-22-33-44-06 |
| PC8 | 192.168.0.118 | 00-11-22-33-44-08 |
| PC9 | 192.168.0.119 | 00-11-22-33-44-09 |

TL8(TL)

| HOST NAME | IP ADDRESS | MAC ADDRESS |
|---|---|---|
| PC6 | 192.168.0.116 | 00-11-22-33-44-06 |
| PC7 | 192.168.0.117 | 00-11-22-33-44-07 |
| PC9 | 192.168.0.119 | 00-11-22-33-44-09 |

TL9(TL)

| HOST NAME | IP ADDRESS | MAC ADDRESS |
|---|---|---|
| PC1 | 192.168.0.111 | 00-11-22-33-44-01 |
| PC5 | 192.168.0.115 | 00-11-22-33-44-05 |
| PC7 | 192.168.0.117 | 00-11-22-33-44-07 |
| PC8 | 192.168.0.118 | 00-11-22-33-44-08 |

OWNER INFORMATION
    UUID: 00000104-0000-0010-7000-0A0AA06D2AA3
    MANUFACTURER'S NAME: YYY
    TYPE: AA-HHSS
    DOMAIN NAME: ZZZ.co.jp — DCp

PUBLIC KEY: 32 42 de e6 77 ah 13 ------ 98 — DCk

CERTIFICATE INFORMATION
    SERIAL NO.: 3520B4FFE5EFA11425342AC5190F03F0
    REGISTRATION DATE: 2005/01/01
    TERM OF VALIDITY: 2005/01/01-2005/12/31 — DCc

METHOD OF MANAGING INFORMATION AND INFORMATION PROCESSING APPARATUS

This application is based on Japanese Patent Application No. 2006-246473 filed on Sep. 12, 2006, in Japanese Patent Office, the entire content of which is hereby incorporated by reference.

TECHNICAL FIELD

The present invention relates to a method for managing information on a network composed of a plurality of nodes and an information processing apparatus as a node composing the network.

BACKGROUND

In recent years, to ensure the mutual communication security between nodes composing a network, that is, terminal devices, the art for a digital certificate has been used widely. By this art, the identity of the node of a communication destination can be confirmed, so that unfair transfer of data between the so-called "spoofing" and a node can be prevented from occurring.

The digital certificate is issued by the certificate authority (CA) which is a third party other than the concerned party of communication and a reliable organization. As a specification for the digital certificate, the one specified in ITU-TX.509 is generally known. In the digital certificate, the term of validity is set and an expired digital certificate cannot be used.

However, even if the term of validity is not expired, when the owner of the digital certificate loses the secret key concerning the digital certificate or it is stolen by another person, the reliability of the digital certificate is impaired. Therefore, the certificate authority reports and opens to the public the information concerning the serial number and so on thereof in a certificate revocation list (CRL), thereby revoking such a digital certificate whose reliability is impaired.

Further, when any attribute (for example, name or company name) of the owner of the digital certificate is changed or when the owner comes not to exist, the certificate authority revokes the digital certificate. Therefore, to enhance the certainty of the confirmation (certification) of the communication destination, it is necessary to confirm not only the contents of the digital certificate but also the revocation certificate list.

In Japanese Laid-Open Patent Application Publication No. 2004-185263, a dispersed cooperative content delivery system according to the aforementioned concept is proposed. In this system, a cache storage is installed in each client, the caches bear their share of contents to be delivered, and for actual content delivery, each of the clients transfers data mutually by using cache index provided. This is the so-called P2P (peer to peer) system.

In communication by the P2P system, the confirmation (certification) of the communication destination as mentioned above is particularly important for security and in Japanese Laid-Open Patent Application Publication No. 2004-185263 indicated above, a public key certificate used in communication is verified. However, it cannot be denied that whether the certificate is valid or not may vary depending on conditions, and it is similarly necessary to confirm the revocation certificate list each time.

However, according to Japanese Laid-Open Patent Application Publication No. 2004-185263, although the public key certificate is verified, if the policy of the sending source for verification of a certificate permits, even if not every time, within a cycle decided by the sending source, the previous verification result is used. For example, before the next sending day of a revocation list CRL, the previous verification result may be used.

That is questionable from the point of security. It is not known when and in what situation the validity of the certificate varies. When a certificate is revoked in some situation, it is desired that it is reflected timely on the, revocation list CRL and is confirmed promptly by a client in need.

Further, conventionally, each client periodically accesses the certificate authority to obtain a CRL, it is however also questionable. When the P2P network is used, there are possibilities of considerably frequent occurrences of cancellations of certificates. For example, when canceling the certificate to update the terminal device as a node, from just the moment the certificate is canceled, all the nodes must not permit connection by the certificate of the canceled node.

In a managing method for obtaining a CRL every given period, there is a fear that using a time period until the CRL is updated at each node, a malicious third person may connect incorrectly to the network by the certificate which ought to have been canceled and may obtain secrete information.

An object of the present invention is to solve the aforementioned problems and to provide a managing method for information relating to revocation of a certificate and an information processing apparatus as a node composing the network. In a network composed of a plurality of nodes wherein the nodes certificate mutually and can communicate directly, when a certificate is revoked due to withdrawal of a node, for immediately reflecting the information on the revocation of the certificate to the revocation lists CRL of the other existing nodes and preventing a danger of unfair connection within the time until the CRLs are updated.

SUMMARY

To solve the aforementioned problems, the present invention has the characteristics indicated below.

In view of forgoing, one embodiment according to one aspect of the present invention is a method for managing a network, the method comprising the steps of:

providing a first node with a digital certificate from a certificate authority;

providing a second node with a certificate revocation list from the certificate authority, the list being used for confirming a revoked digital certificate;

sending the digital certificate from the first node to the second node when a communication is conducted between the first node and the second node;

verifying the digital certificate received from the first node at the second node by using the certificate revocation list and refusing the communication when the received digital certificate is indicated as a revoked digital certificate by the certificate revocation list; and notifying the certificate authority and the second node of withdrawal of the first node from the network in order to update the certificate revocation list when the first node withdraws from the network.

According to another aspect of the present, invention, another embodiment is an information processing apparatus as a node on a network where communication is conducted between nodes by using a digital certificate issued by a certificate authority, the apparatus comprising:

a digital certificate storing section which is adapted to store a digital certificate issued by the certificate authority for the apparatus;

a digital certificate sending section which is adapted to send the digital certificate stored in the digital certificate storing section to another node when the apparatus communicates with said another node; and a withdrawal notifying section which is adapted to notify the certificate authority and said another node of withdrawal of the apparatus from the network in order to revoke the digital certificate when the apparatus withdraws from the network.

BRIEF DESCRIPTION OF THE DRAWINGS

FIG. 4 is a drawing showing examples of connection tables TL of the terminal devices 2 related as shown in FIG. 3.

FIG. 6 is a drawing showing an example of a digital certificate DC.

DETAILED DESCRIPTION OF THE PREFERRED EMBODIMENT

Hereinafter, the embodiment relating to the present invention will be explained with reference to the accompanying drawings.

(Whole Constitution of Network)

Figure 1:
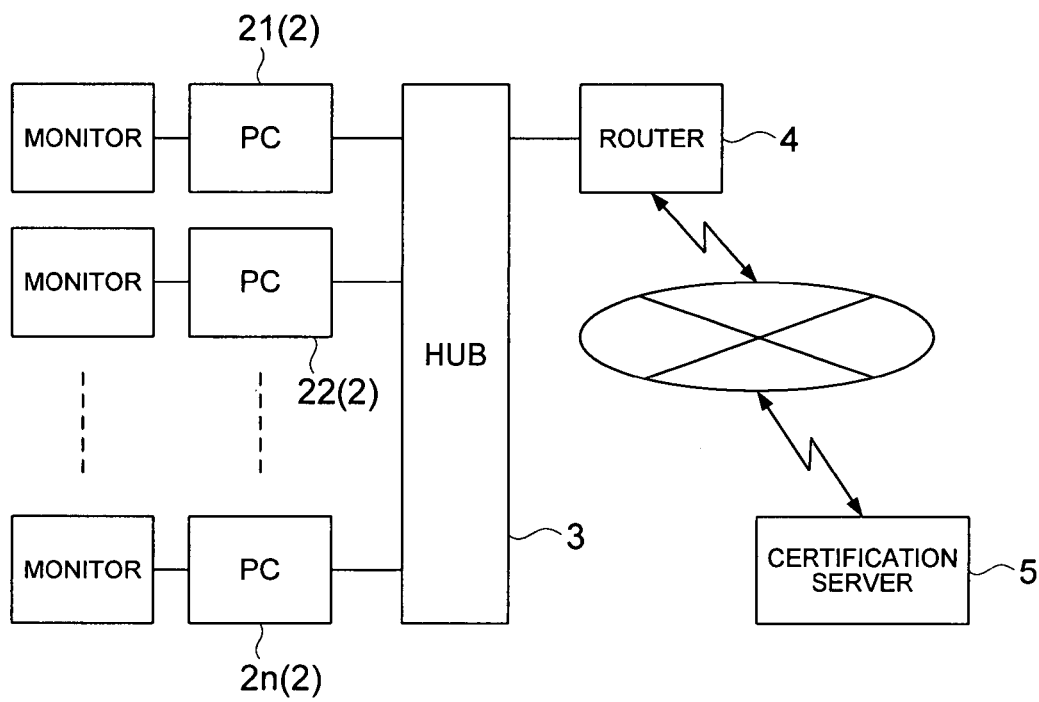
FIG. 1 is a drawing showing a whole constitution example of a network 1.

FIG. 1 is a drawing showing an example of the whole constitution of a network 1. By referring to FIG. 1, with respect to the embodiment of the network relating to the present invention, the whole constitution thereof will be explained.

The network 1 relating to the embodiment of the present invention, as shown in FIG. 1, is a LAN (local area network) constructed with the nodes such as a plurality of terminal devices 2 (21, 22, - - - , 2n), a switching hub 3, a router 4, and a certification server 5. These terminal devices 2 are connected to the switching hub 3 in a star shape by a twisted pair cable.

The terminal devices 2 as nodes composing the network are an information processing apparatus relating to the present invention, which are apparatuses for executing an I/O process of data between itself and other device such as a personal computer, a work station, or a printer. Hereinafter, an example where the personal computer is used as a terminal device 2 will be explained.

Further, this embodiment uses a configuration of a communication network called P2P (peer to peer). P2P is a use configuration of a network for directly transferring information between many unspecified nodes, and there are two kinds available such as a one for technologically requiring mediation of a central server and a one for transferring data by a bucket-brigade method.

If the central server is required, the central server only offers a file retrieval database and controls connection of nodes, and data itself is transferred between the nodes by direction connection.

Figure 3:
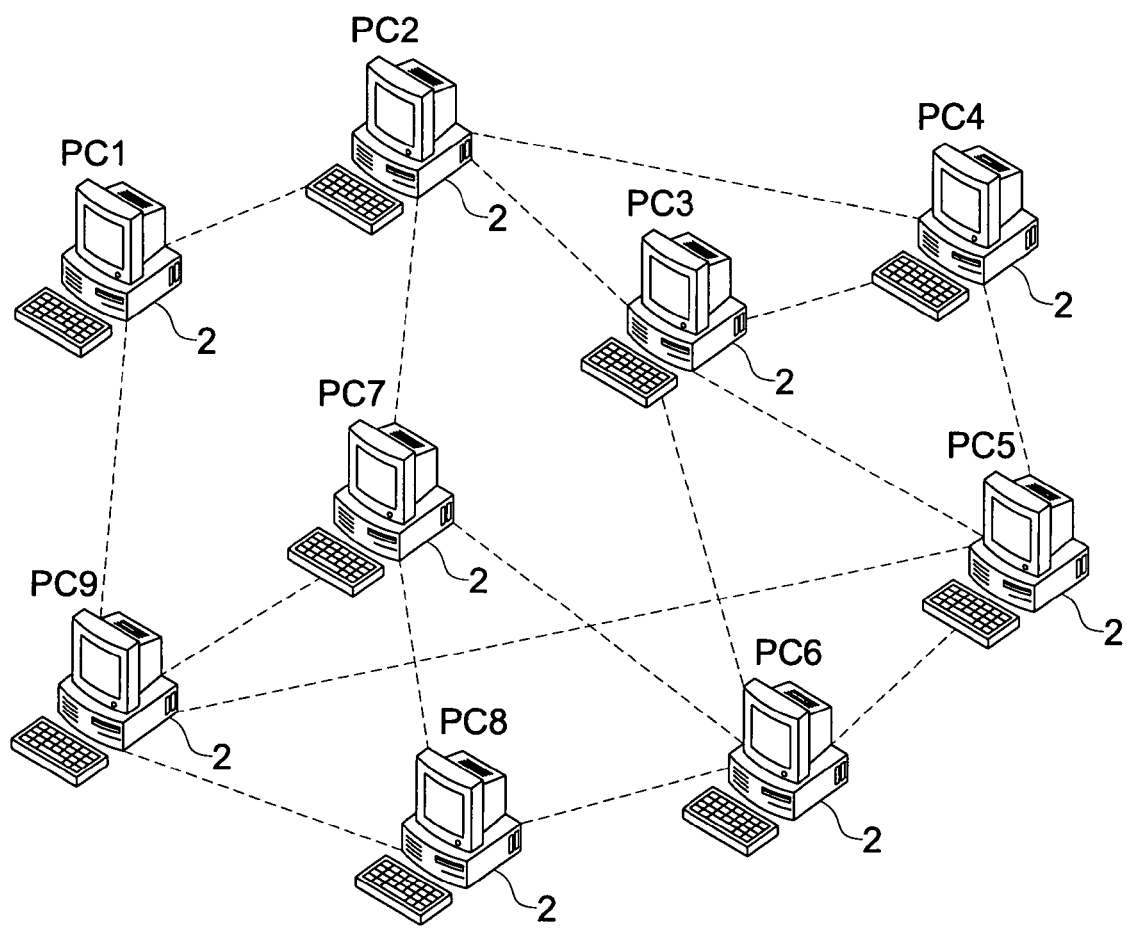
FIG. 3 is a drawing showing the connection configuration of all the terminal devices 2 composing the, network 1, that is, a logical topology example of the nodes.

In this embodiment, the central server is not used, and the connection topology as shown in FIG. 3 will be explained later, the nodes (the terminal devices 2) related beforehand are connected directly and communicate with each other. The other nodes are connected indirectly via the nodes connected directly. The certification server 5 takes charge of only management relating to a certificate for certification and does not directly relate to connection for communication. Further, the router 4 does not relate directly to communication between the terminal devices either.

In the P2P, the nodes directly communicate with each other, so that the security of how to certificate the mutual validity and how to suppress room for causing unfairness are important. Although, for that purpose, a digital certificate issued by the certification server 5 is used, it is necessary for each node itself to timely confirm and manage whether the certificate itself is valid or not.

Hereinafter, from the aforementioned point of view, the case, including the managing method in this embodiment, that the terminal devices 2 in these nodes mutually communicate data will be explained.

(Constitution of Terminal Devices)

Figure 2:
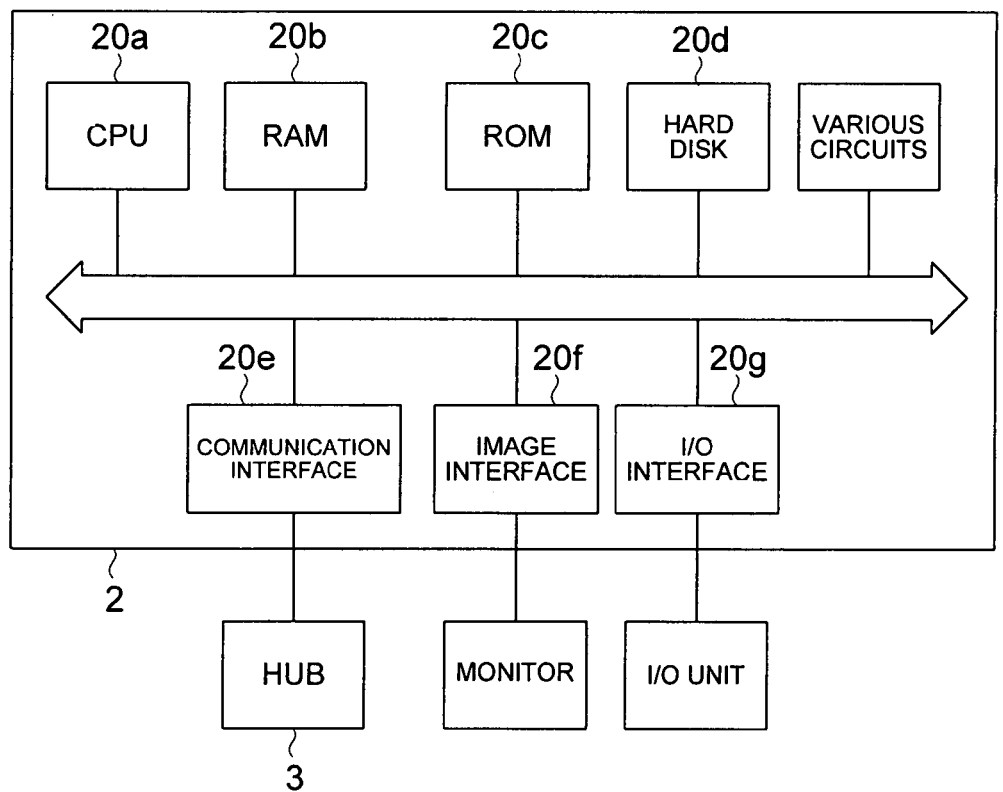
FIG. 2 is a drawing showing a hardware constitution example of a terminal device 2 composing the network 1.

FIG. 2 is a drawing showing an example of the hardware constitution of the terminal device 2.

The terminal device 2, as shown in FIG. 2, is composed of a CPU 20$a$, a RAM 20$b$, a ROM 20$c$, a hard disk 20$d$, a communication interface 20$e$, an image interface 20$f$, an I/O interface 20$g$, and other various circuits or devices.

The communication interface 20$e$, for example, is an NIC (network interface card) and is connected to one of the ports of the switching hub 3 via the twisted pair cable. The image interface 20$f$ is connected to a monitor and sends an image signal to the monitor for displaying a screen image.

The I/O interface 20$g$ is connected to an input unit, such as a keyboard or a mouse, or an external storage unit such as a CD-ROM drive. And, it inputs from the input unit a signal indicating the contents of the operation performed by a user for the input unit. Or, it inputs data recorded on a recording medium such as a CD-ROM by causing the external storage device to read it. Or, it outputs data to be written into the recording medium to the external storage device.

In the hard disk 20d, as explained later using the function block diagrams (FIGS. 5(a) and 5(b)), there are stored the programs and data for realizing the functions of a connection table holding unit 201, a connection table managing unit 202, a data holding unit 203, a data operation unit 204, a certification unit 205, a network application unit 206, a data reception unit 207, a data analysis unit 208, a data preparation unit 209, and a data transmission unit 210. These programs and data are read into the RAM 20b when necessary and the programs are executed by the CPU 20a.

To discriminate each of the terminal devices 2 from the other terminal devices 2, the host name (machine name), IP address, and MAC address are given to it. The host name can be assigned freely by a manager of the network 1. The IP address is given according to the rule of the network 1. The MAC address is an address given fixedly to the communication interface 10e of the concerned terminal device 2.

In this embodiment, the host names such as PC1, PC2, - - - are assigned to the respective terminal devices 21, 22, - - -. Hereinafter, these terminal devices 2 may be recorded by the host names.

(Connection Configuration of Nodes)

FIG. 3 is a drawing showing the connection configuration of the nodes, that is, a logical topology example of the terminal devices 2. The connection configuration of the nodes (terminal devices) will be explained by referring to FIG. 3.

The terminal devices 2, as shown in FIG. 3, are supposed to be arranged in a virtual space. And, as shown by the dotted lines, each terminal device is related to at least one other terminal device 2 in the neighborhood thereof in the virtual space. Moreover, by this relationship, all the, terminal devices 2 are related to each other directly or indirectly.

Further, "direct relationship" is referred to as connection by one dotted line in FIG. 3 (for example, the relationship between PC1 and PC2 or PC9 shown in FIG. 3) and "indirect relationship" is referred to as connection by two or more dotted lines and one or more nodes (for example, the relationship between PC1 and PC4 shown in FIG. 3). Each of the terminal devices 2 transmits data to other terminal devices 2 directly related to itself.

FIG. 4 is a drawing showing examples of the connection tables TL of the terminal devices 2 related as shown in FIG. 3. Each of the terminal devices 2 tables and holds a list of information for connection with other terminal devices 2 which is "directly related" and to which data can be transmitted directly.

(Function of Each Unit of Terminal Device)

Figure 5:
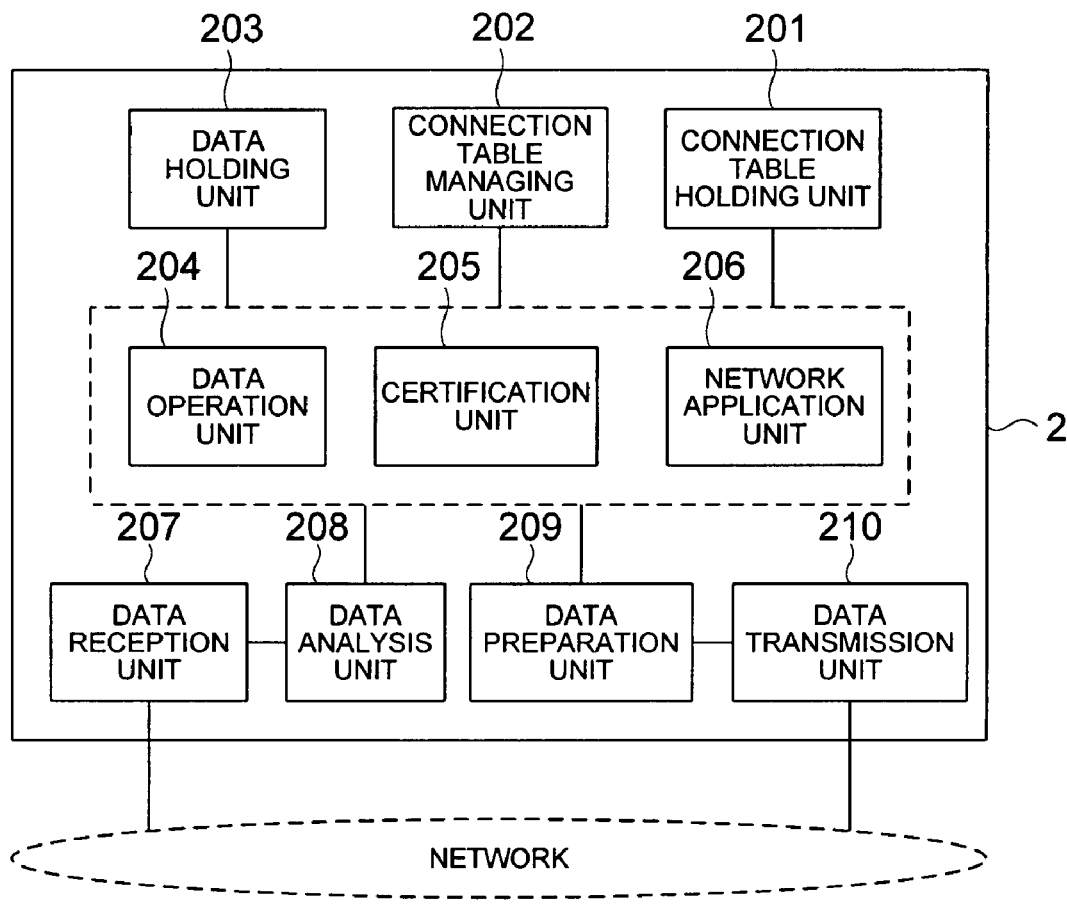
FIG. 5(a) is a block diagram showing a function constitution example of the terminal device 2 and FIG. 5(b) is a drawing showing the internal constitution of the function of a network application unit 206.
Figure 5:
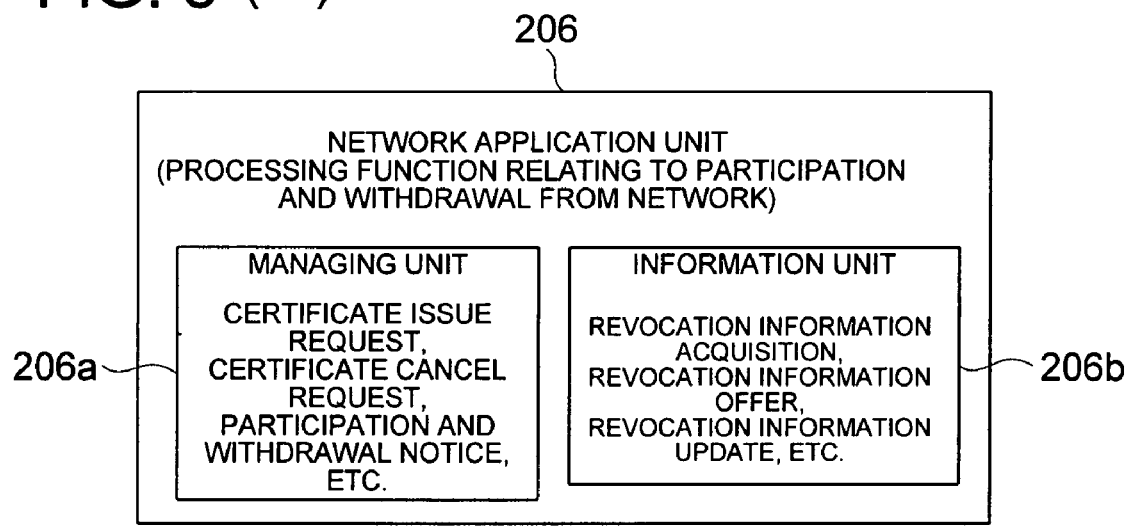

FIG. 5(a) is a block diagram showing an example of the functional constitution of the terminal device 2. By referring to FIG. 5(a), the processing function of each unit of the terminal device 2 will be explained.

The connection table holding unit 201 stores the connection tables TL showing a list of the attributes of the host name, IP address, and MAC address of each of other terminal devices 2 directly related to the concerned terminal device 2 itself. For example, in the connection table holding unit 201 of PC1, PC2, PC6, PC7, PC8, and PC9 shown in FIG. 3, connection tables TL1, TL2, TL6, TL7, TL8, and TL9 shown in FIG. 4 are stored respectively. The contents of these connection tables TL are prepared beforehand by the manager on the basis of the relationship of the respective terminal devices 2.

The connection table managing unit 202 manages the connection tables TL held in the connection table holding unit 201.

The data holding unit 203 stores the attribute data indicating the attributes of the concerned terminal device 2 or a user, digital certificate DC of the concerned terminal device 2 itself, revocation list CRL, data used in the operating system (OS) or application software, data prepared by the user by the application software, and other various data as files. The attribute data includes, for example, information such as the UUID (universally unique identifier), manufacturer's name, type, or domain name.

The digital certificate DC is issued by the certification server 5 upon request from the concerned terminal device 2, is held by the terminal device 2, and at the time of communication between the terminal devices 2, is used to verify each other. The revocation list CRL registers and records the revocation of the digital certificate DC due to withdrawal of any of the terminal devices and is managed by the certification server 5, though in this embodiment for performing P2P communication, the terminal devices 2 respectively hold the revocation lists CRL and manage them including updating. It will be described later in detail.

The data operation unit 204 performs various operations such as storing data in the data holding unit 203 and updating data stored in the data holding unit 203. For example, whenever the environment or set contents of the terminal devices 2 are changed, it updates the attribute data. Or, it updates the revocation lists CRL.

The certification unit 205, on the basis of the digital certificate DC transmitted from other terminal devices 2, performs the verification process for the concerned other terminal device 2. Further, it confirms by referring to the revocation list CRL stored in the data holding unit 203 whether the transmitted digital certificate DC is revoked or not.

The network application unit 206 performs the process where the concerned terminal device 2 is intended to newly participate in or withdraw from the network.

The data operation unit 204, certification unit 205, and network application unit 206, when necessary, communicate data with other terminal devices 2 of the network 1 via the data reception unit 207 and data transmission unit 210, and when necessary, refer to or update the data of the connection table holding unit 201 and data holding unit 203.

FIG. 5(b) is a drawing showing the internal constitution of the function of the network application unit 206. By referring to FIG. 5(b), the function of the network application unit 206, that is, the processing function where the concerned terminal device 2 is intended to participate in or withdraw from the network will be explained.

In the network application unit 206, a management unit 206a for managing the procedure such as liaison of participation or withdrawal and an information unit 206b for controlling acquisition, transmission, reception, and change of information to be revoked in correspondence with it are included. These units control for performing the processing operation indicated below.

The management unit 206a, for example, at the time of withdrawal, transmits a cancellation request of the digital certificate DC to the certification server 5. By doing this, it permits the certification server 5 to update the certificate revocation list (CRL) and receives a cancellation completion notice of the digital certificate DC transmitted.

Further, the management unit 206a receives the cancellation completion notice of the digital certificate DC at the time of withdrawal, and then transmits the withdrawal notice to other terminal devices 2 related directly. By doing this, it promotes the terminal devices 2 which are transmission destinations to inquire the certification server 5 about the revocation lists held by the respective terminal devices and to update them. Namely, it functions as a withdrawal notifying section.

The information unit 206b, for example, at the time of withdrawal, after finishing the withdrawal procedure, revokes a predetermined information held by itself. Further, upon receipt of a withdrawal notice from other terminal devices 2, it requests the certification server 5 for issue of the certificate revocation list (CRL) and updates the revocation list CRL held by itself. Namely, it functions as a revocation information obtaining section.

Further, in certain circumstances, the information unit 206b, upon receipt of a withdrawal notice form other terminal devices 2, on the basis of the withdrawal notice or on the basis of the revocation list CRL distributed with the withdrawal notice, updates the revocation list CRL held by itself. Namely, it functions as a revocation information changing section.

Further, the information unit 206b distributes other terminal devices 2 which cannot receive the withdrawal notice in the temporary connection stop state with the information on revocation such as the revocation list CRL held by itself and promotes the concerned terminal devices 2 to update the information on revocation. Namely, it functions as a first and a second revocation information offering section.

By referring to FIG. 5(a) again, the explanation of each unit of the terminal device 2 will be continued.

The data reception unit 207 performs the control process for executing data communication with other terminal devices 2. The data reception unit 207, among the packets flowing through the network 1, receives a one necessary for the terminal device 2.

The data analysis unit 208 extracts necessary information from received data of the data reception unit 207 and analyzes the contents thereof, thereby determines the kind of the received data.

The data preparation unit 209 prepares transmission data to be transmitted to other terminal devices. 2 based on the instruction by the data operation unit 204, certification unit 205, or network application unit 206.

The data transmission unit 210 packetizes the transmission data generated by the transmission data preparation unit 209 and transmits it to other terminal devices 2.
(Digital Certificate DC and Revocation List CRL)

The digital certificate DC is generally issued by the certification server 5 according to application from a person requiring it. And, it is transmitted to the terminal device 2 of the applicant from the certificate server 5. In this embodiment, the digital certificate DC has been issued and given to each of the terminal devices 2 composing the network 1.

When the registered contents are changed or the secret key is stolen, lost, or broken down, the digital certificate DC must be revoked since the reliability thereof is impaired. Therefore, generally, in case that the digital certificate DC issued by the certification server 5 must be revoked, the server records information about the serial number of the digital certificate DC and revocation date in the certificate revocation list (CRL) and makes it open to the public. By doing this, the digital certificate DC is revoked.

Further, in this embodiment, the terminal devices 2 respectively have independently a revocation list CRL indicating the revoked digital certificate DC separately from the certificate revocation list (CRL) held by the certification server 5.

The revocation lists CRL are properly updated in accordance with the contents of the certificate revocation list (CRL) which is made open to the public by the certification server 5. Namely, the information on the revoked digital certificate DC is registered one after another. However, to respond to the case that the certification server 5 comes down and the communication line fails, or a firewall is set for the certification server 5 not to be connected, the information of the revoked digital certificate DC is registered one after another also by another method.

Although described later, this embodiment adopts a configuration that the revocation due to withdrawal of other terminal devices 2 is immediately reflected on the revocation list CRL held by each terminal device not via the certification server 5 always.

In the digital certificate DC, the information on the attributes of the owner of the digital certificate DC, public key, and the attributes of the certification server 5 and digital certificate DC is included. Here, among this information, the particularly important ones in this embodiment will be explained by referring to FIG. 6. FIG. 6 is a drawing showing an example of the digital certificate DC.

In the digital certificate DC, as shown in FIG. 6, owner's information DCp, a public key DCk, and certificate information DCc are recorded. The owner's information DCp is information on the owner of the digital certificate DC or the attributes of the terminal device 2 and includes, for example, the UUID (universally unique identifier), manufacturer's name, type, IP address, and domain name. Additionally, it may include information on the IP address or mail address.

"UUID" is a general purpose identifier and for example, is generated by combining the MAC address of the terminal device 2 of the owner of the digital certificate DC and the character string indicating the date of issue of the UUID. "Manufacturer's name" indicates the name of the manufacturer of the terminal device 2 or the NIC installed therein. "Type" indicates the type of the terminal device 2 or the NIC installed therein. "Domain name" indicates the name of the domain to which the terminal device 2 belongs.

The public key DCk is used for the respective terminal devices 2 to transfer safely data relating to the common key for the SSL communication which will be described later. Further, each of the terminal devices 2 holds the secret key which is a counterpart to the public key DCk included in the own digital certificate DC.

The certificate information DCc is information on the attributes of the digital certificate DC itself and for example, includes information on the serial number, registration date, and term of validity. "Serial number" is a number for uniquely discriminating the digital certificate DC thereof. "Registration date" indicates the issued date of the digital certificate DC thereof. "Term of validity" indicates the start and end of the term of validity.

Further, the standard specification for the general digital certificate DC and revocation list CRL is decided as X.509 by the ITU (International Telecommunication Union). In the following explanation for SSL communication, the digital certificate will be referred to as the X.509 certificate. Further, regarding the detailed digital certificate and revocation list, refer to IETF RFC (Internet Engineering Task Force Request for Comments) 2459, "Internet X.509 Public Key infrastructure Certificate and CRL Profile". Further, regarding detailed SSL communication, refer to IETF RFC2246, "The TLS Protocol Version 1.0" or INTERNET-DRAFT, "The SSL Protocol Version 3.0".
(SSL Communication Between Nodes)

On the other hand, each of the terminal devices 2 in this embodiment can execute SSL (secure sockets layer) communication with the terminal device 2 which is related directly or indirectly. The SSL is a protocol for coding using the digital certificate DC, thereby safely transmitting and receiving data on the network. The flow of the processing for establishing connection for the SSL communication in this embodiment will be explained below.

Figure 7:
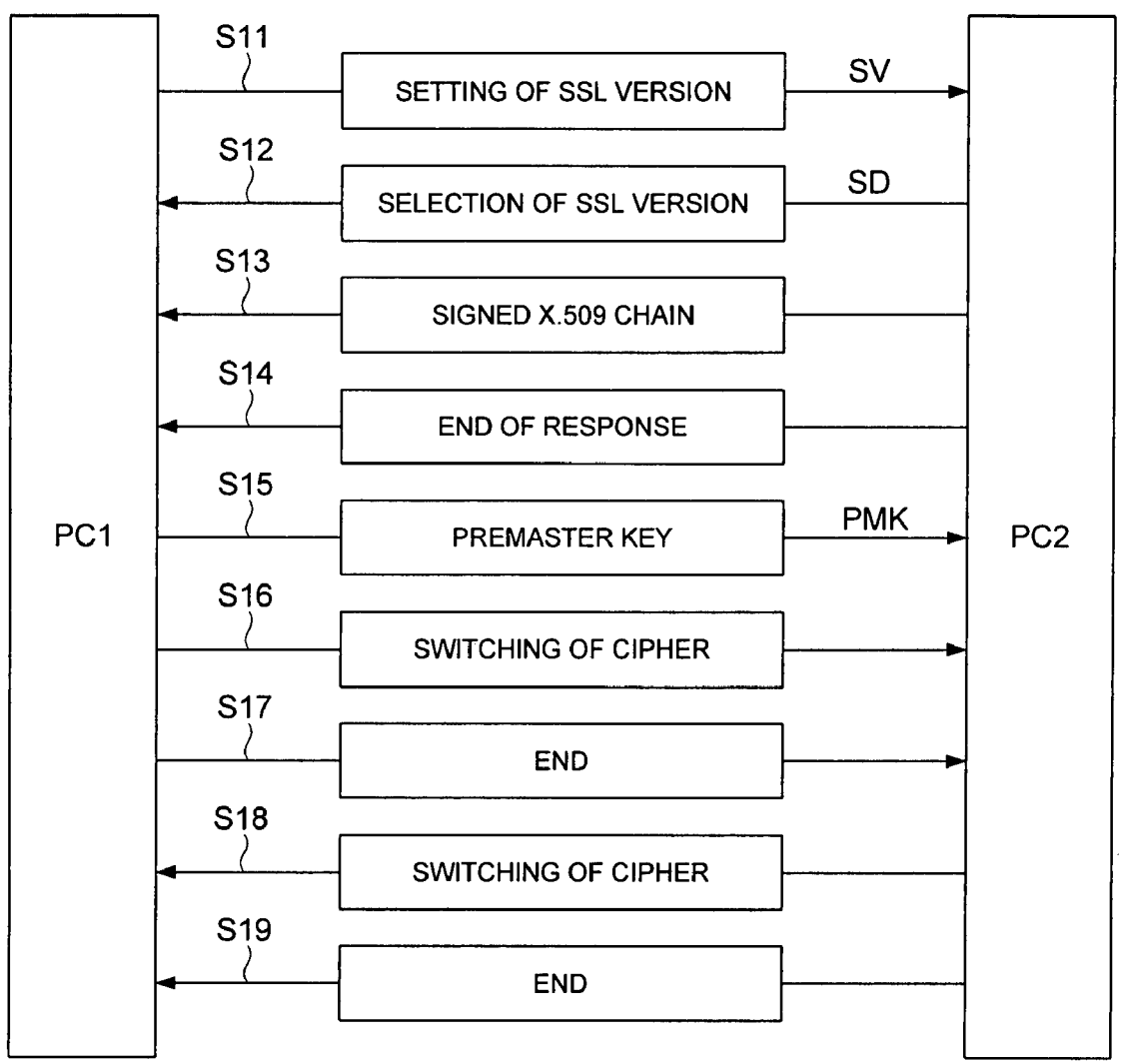
FIG. 7 is a sequence drawing for explaining a processing example when establishing connection of SSL communication.

FIG. 7 is a drawing for explaining an example of the flow of the processing when establishing connection for the SSL communication. Referring to FIG. 7, more detail will be explained by taking he case as an example where the terminal devices, PC1 and PC2 for example, intend to execute the target communication.

At the preceding stage of establishment of connection for SSL communication, the connection itself is established. Firstly, it is assumed that at PC1 for example, a command indicating the purport of intending to communicate with PC2 is inputted by a user by operating the keyboard. Then, the data preparation unit 209 prepares connection request data, and the data transmission unit 210 transmits the connection request data to the other terminal device PC2.

Then, at PC2, the data reception unit 207 receives the connection request data from PC1, and the data analysis unit 208 analyzes the kind of the data. Here, the data is naturally analyzed as connection request data. The data preparation unit 209 generates connection permission data indicating the purport of permitting connection and transmits it to PC1.

When the connection permission data is received by the data reception unit 207 of PC1, a predetermined process is performed, and then PC1 and PC2 are connected. However, at this point of time, connection for SSL communication is not established yet, hereafter the flow of establishment of connection for SSL communication is started.

Firstly, at either of PC1 and PC2, the data preparation unit 209 generates SSL version data SV indicating an applicable SSL version and the data transmission unit 210 transmits it to the other one (Step S11). In FIG. 7, it is assumed that PC1 transmits the SSL version data SV to PC2.

Then, at PC2, the data reception unit 207 receives the SSL version data SV, and the data analysis unit 208 analyzes the kind of the data, and the data preparation unit 209 selects one applicable version at PC2 among the versions indicated in the SSL version data SV and generates SSL version selection data SD indicating it. And, the data transmission unit 210 transmits it to PC1 (Step S12).

At PC1, when the SSL version selection data SD from PC2 is received by the data reception unit 207, the SSL of the version indicated therein is decided to be adopted as a protocol for the target communication. The SSL is similarly decided at PC2.

Next, at PC1, the X.509 digital certificate DC is transmitted to PC1. Unless the X.509 certificate DC is a certificate signed by the well-known certification server 5, the chain of the certificate up to there is also transmitted. PC1 holds beforehand root certificates for certifying the certification server 5 itself and verifies whether a root certificate which signs the X.509 certificate DC received from PC2 is included in it or not. Further, PC1 confirms whether the concerned certificate DC is recorded in the certificate revocation list (CRL) which signed the certificate DC and issued by the certification server 5 or not, and if it is recorded, the communication is ended at this point of time (Step S13).

When the certification process is cleared, PC2 notifies PC1 of the purport of response end (Step S14).

Upon receipt of the notice of response end from PC2, to generate a common key used in the SSL communication, PC1 generates a premaster key PMK which is a random value of 384 bits long. The data preparation unit 209 of PC1 encrypts the premaster key PMK by the public key DCk of PC2 included in the X.509 certificate DC received from PC2 and transmits it to PC2 (Step S15).

Further, PC1, on the basis of the premaster key PMK, generates a common key actually used for encrypting of data and controls so as to switch the cipher key for communication to the common key. Further, it transmits a cipher switching notice of the purport of switching the cipher key to PC2 (Step S16).

Upon receipt of a notice of cipher switching end from PC1 (Step S17), PC2, to switch the cipher key also by itself, transmits a cipher switching notice to PC1 (Step S18). The data reception unit 207 of PC2 decodes the premaster key PMK encrypted by its own public key DCk received from PC1 by its own corresponding secrete key. When the data analysis unit 208 analyzes it and confirms that the data kind is the premaster key PMK, the data operation unit 204 generates a common key on the basis of the received premaster key PMK, thereafter controls so that encryption communication by the common key is executed between PC2 and PC1. Namely, it switches the cipher key.

When the cipher key switching aforementioned is finished, PC2 transmits a notice of cipher switching end to PC1 (Step S19).

By the aforementioned process, the connection for SSL communication is established between PC1 and PC2. By doing this, the desired communication can be executed safely.

In the aforementioned establishment of connection, the case that the X.509 certificate DC of PC2 is confirmed by PC1 is shown, however, there is a case that the X.509 certificate DC of PC1 is confirmed by PC2. This is called SSL client certification communication.

To execute the SSL client certification communication between the PCs or between the PCs and the certification server, each of them must hold the X.509 certificate DC and must hold a root certificate to verify the certificate DC.

As mentioned above, each of the terminal devices 2 of the network 1 can perform a safely communicating operation as a node certified mutually.

However, even a certificate DC signed once by the certification server 5 may be revoked due to various circumstances. For example, there is a case that since a specific terminal device 2 is canceled, it withdraws from the network 1.

In such a case, as mentioned above, it is recorded in the certificate revocation list (CRL) issued by the certification server 5 and the revocation list (CRL) is confirmed, thus the terminal devices 2 which are existing nodes can know that the terminal device 2 which is a node to be canceled withdraws from the network 1. However, if the procedure is not executed quickly, for example, taking advantage of the time difference from the withdrawal operation start time to confirmation of the revocation list (CRL) by the existing nodes, there are possibilities that the terminal device which ought to have been canceled accesses an optional existing node of the network 1.

To avoid such a danger, this embodiment adopts a processing method as explained below when the terminal device 2 withdraws from the node. Hereinafter, each terminal device is referred to as a node, and the process where the terminal device 2 (node) withdraws will be explained.

(Processing Example 1 at the Time of Withdrawal of Node)

Figure 8:
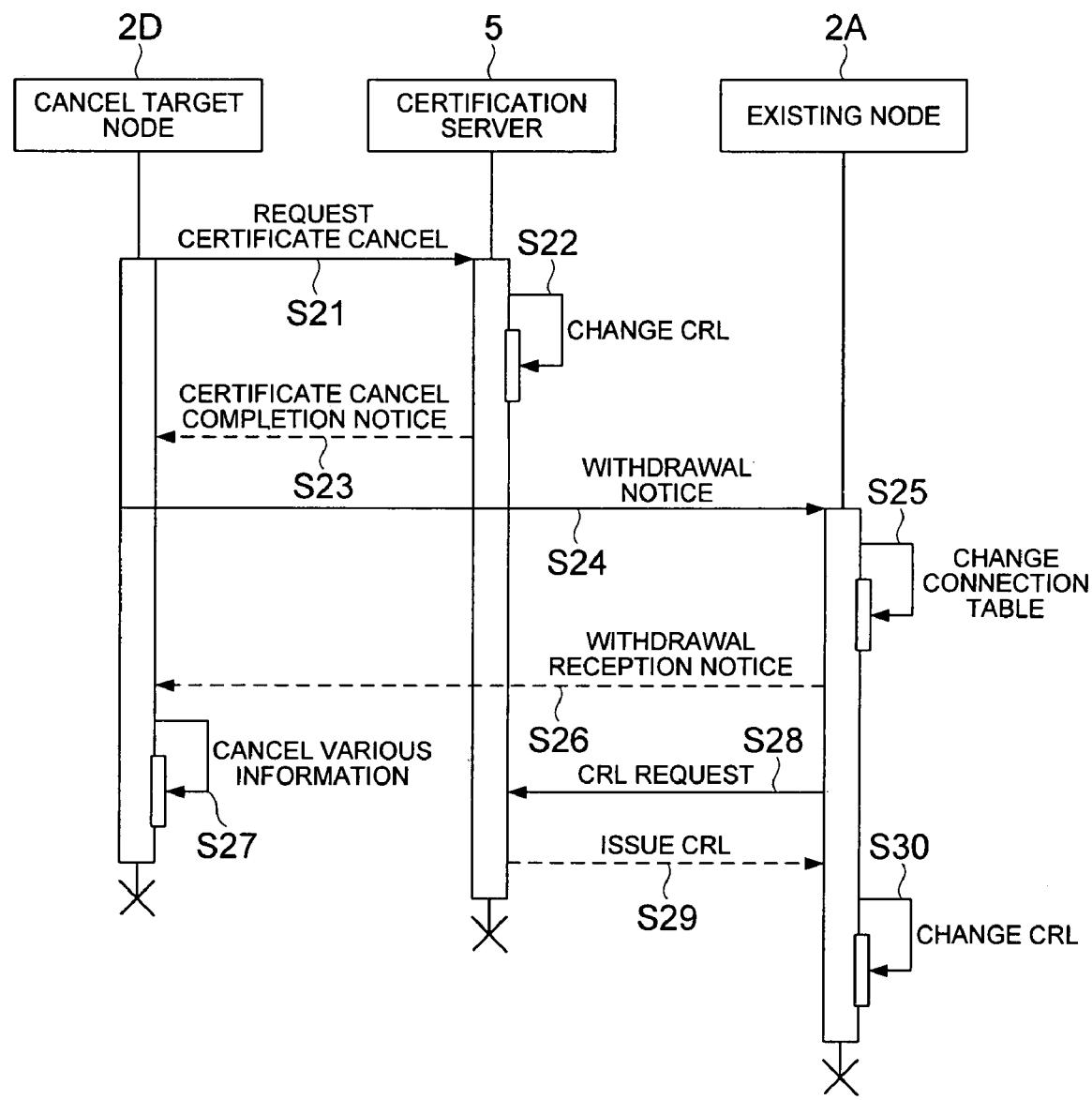
FIG. 8 is a drawing showing the sequence of a processing example 1 when a cancel target node 2D withdraws from the network 1.
Figure 9:
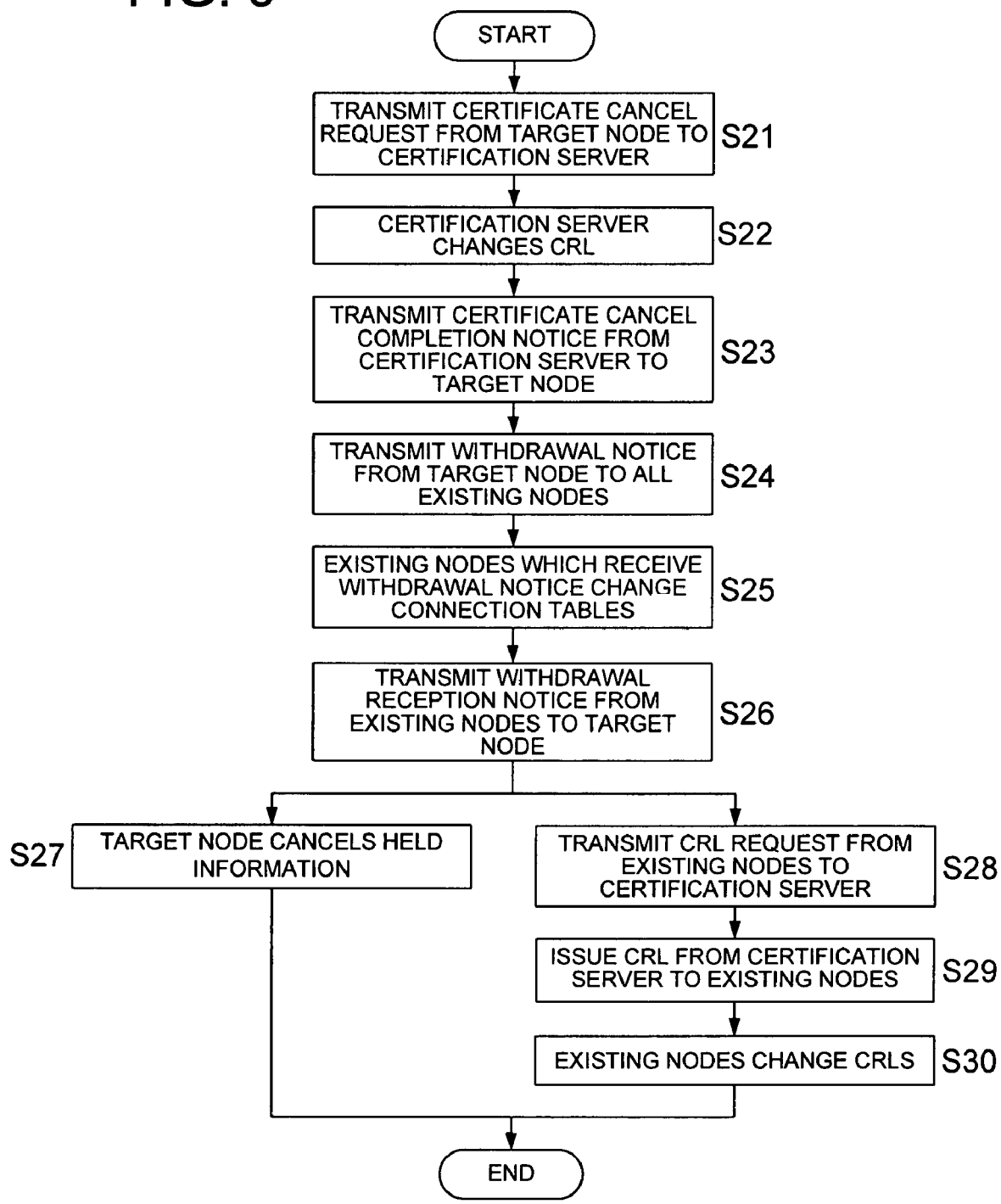
FIG. 9 is a flow chart showing the procedure of the processing example 1 when the cancel target node 2D withdraws from the network 1.

FIG. 8 is a drawing showing the sequence of the processing example 1 when the cancel target node 2D withdraws from the network 1. FIG. 9 is similarly a flow chart showing the procedure of the processing example 1 where the cancel target node 2D withdraws from the network 1. By referring to FIGS. 8 and 9, the processing example 1 where the cancel target node 2D withdraws from the network 1 will be explained.

What is related to the process at the time of withdrawal of the node is the cancel target node 2D to withdraw, certification server 5, and other existing node 2A. In FIG. 8, the processing operations regarding the three kinds of nodes are illustrated according to the sequence thereof. The numerals assigned to the respective processing operations are the same as the numerals of the corresponding steps of the flow chart shown in FIG. 9.

Firstly, at Step S21, the cancel target node 2D transmits a certificate cancel request to the certification server 5. This is controlled as a procedure for withdrawal of the cancel target node 2D by the network application unit 206, and the certificate cancel request prepared by the data preparation unit 209 is transmitted by the data transmission unit 210.

At Step S22, upon receipt of the certificate cancel request from the cancel target node 2D, the certification server 5 includes the digital certificate DC of the cancel target node 2D in the certificate cancel list thereof, updates the certificate revocation list (CRL) on the basis of it, and records certificate revocation of the cancel target node 2D.

Then, after the certification server 5 updates the certificate revocation list (CRL), transmits a certificate cancel completion notice to the cancel target node 2D at Step S23. As the SSL communication established the connection at its start time, so that even if the certificate revocation list (CRL) is changed during communication, no obstacles are caused to transmission of the certificate cancel completion notice.

At Step S24, upon receipt of the certificate cancel completion notice, the cancel target node 2D transmits a withdrawal notice to all the other existing nodes 2A recorded in the connection tables TL held by itself. This is similarly controlled by the network application unit 206 and by referring to the connection table holding unit 201, and is transmitted via the data preparation unit 209 and data transmission unit 210.

As mentioned above, the steps from Step S21 to Step S24 function as a withdrawal notice step.

At Step S25, the respective existing nodes 2A receiving the withdrawal notice update the connection tables TL held by them in the connection table holding unit 201 under the control of the connection table managing unit 202. Namely, the relation to the cancel target node 2D is deleted.

Then, at Step S26, the respective existing nodes 2A updating the connection tables TL transmit a withdrawal reception notice to the cancel target node 2D.

At Step S27, the cancel target node 2D waits for a response for a predetermined period of time and then cancels all the predetermined information held by itself. The reason of waiting for a response for the predetermined period of time is that whether it can communicate without trouble with all the relating existing nodes recorded in the connection table TL held by itself or not is indefinite.

In the case that there are existing nodes which cannot communicate temporarily, a measure for performing the procedure without delay is necessary at the point of time when they get to be able to communicate, and such a case will be described later.

At Step S28, the respective existing nodes 2A which change the connection tables TL and transmit a withdrawal reception notice transmit a CRL request to the certification server 5.

At Step S29, the certification server 5 receiving the CRL request from the respective existing nodes 2A issues a latest revocation list (CRL) to the respective existing nodes 2A.

At Step S30, the respective existing nodes 2A receiving the latest CRL issue from the certification server 5, on the basis of the received revocation list (CRL), update the revocation list CRL held by their own data holding unit 203.

The steps from Step S28 to Step S30 are controlled by the network application unit 206, and the CRL request is transmitted via the data preparation unit 209 and data transmission unit 210, and the revocation list CRL of the data holding unit 203 is updated by the data operation unit 204.

Therefore, the steps from Step S28 to Step S30 function as a revocation information obtaining step.

By use of such a sequence for the time of withdrawal, at the time when the cancel target node 2D is canceled, the other existing nodes 2A quickly obtain the revocation lists CRL and can execute all the communications with the SSL kept being maintained.

As mentioned above, when the cancel target node 2D withdraws from the network 1, it transmits a withdrawal notice to all the other existing nodes 2A to which it is related and promotes them to update the connection tables TL and revocation lists CRL held by them, thus within the time until the revocation of the cancel target node 2D is reflected on the revocation lists CRL of the other existing nodes 2A, a danger of execution of unfair connection can be avoided.

(Processing Example 2 at the Time of Withdrawal of Node)

An example will be described below as a processing example 2, the example where there is an existing node 2C which cannot communicate due to a temporally connection failure because of, for example, stopping of power supply. The processing example 2 takes a measure such as quickly performing a procedure at the point of time when it can be connected to the network.

Figure 10:
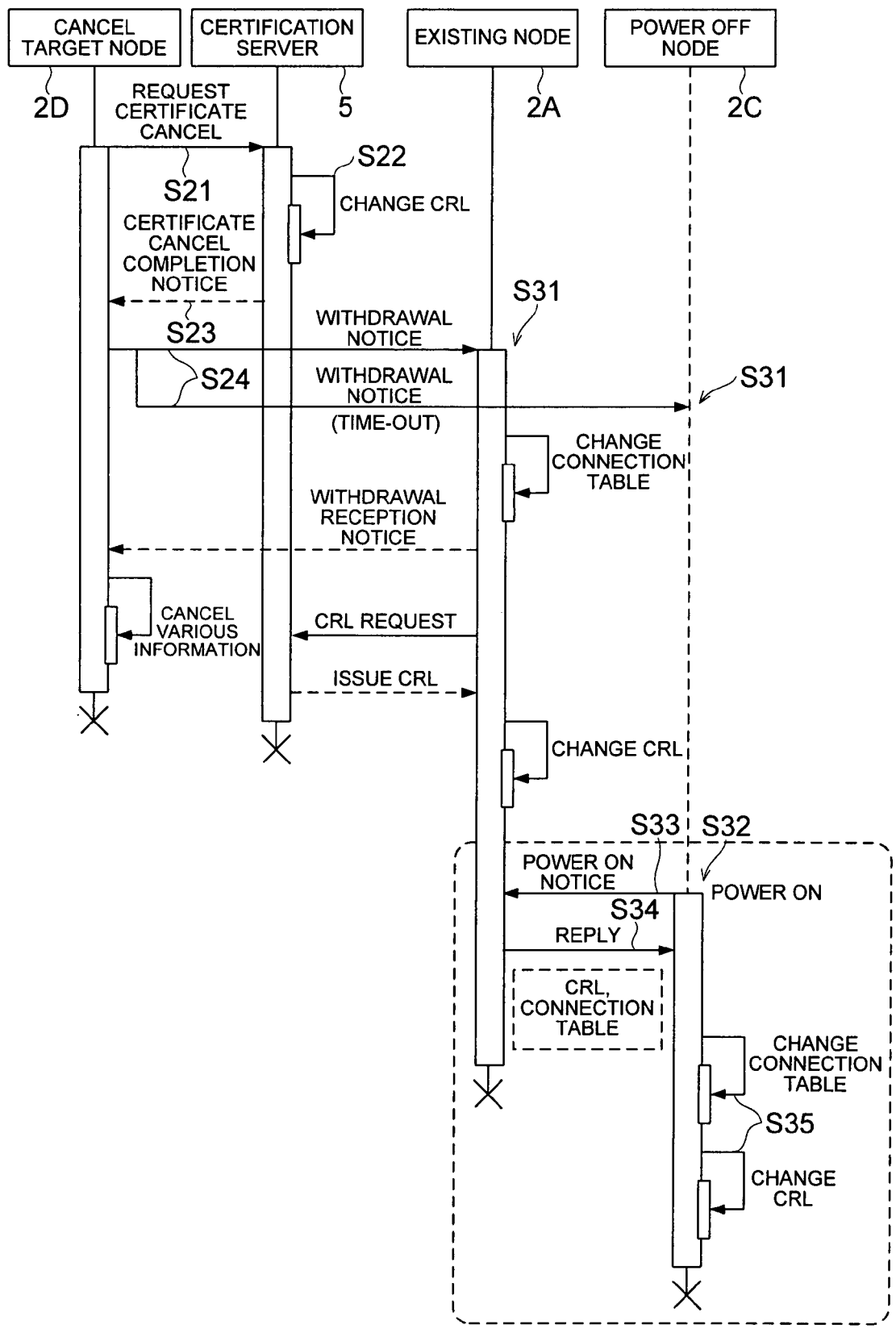
FIG. 10 is a drawing showing the sequence of a processing example 2 if there is an existing node 2C whose power source is stopped temporarily when the cancel target node 2D withdraws from the network 1.
Figure 11:
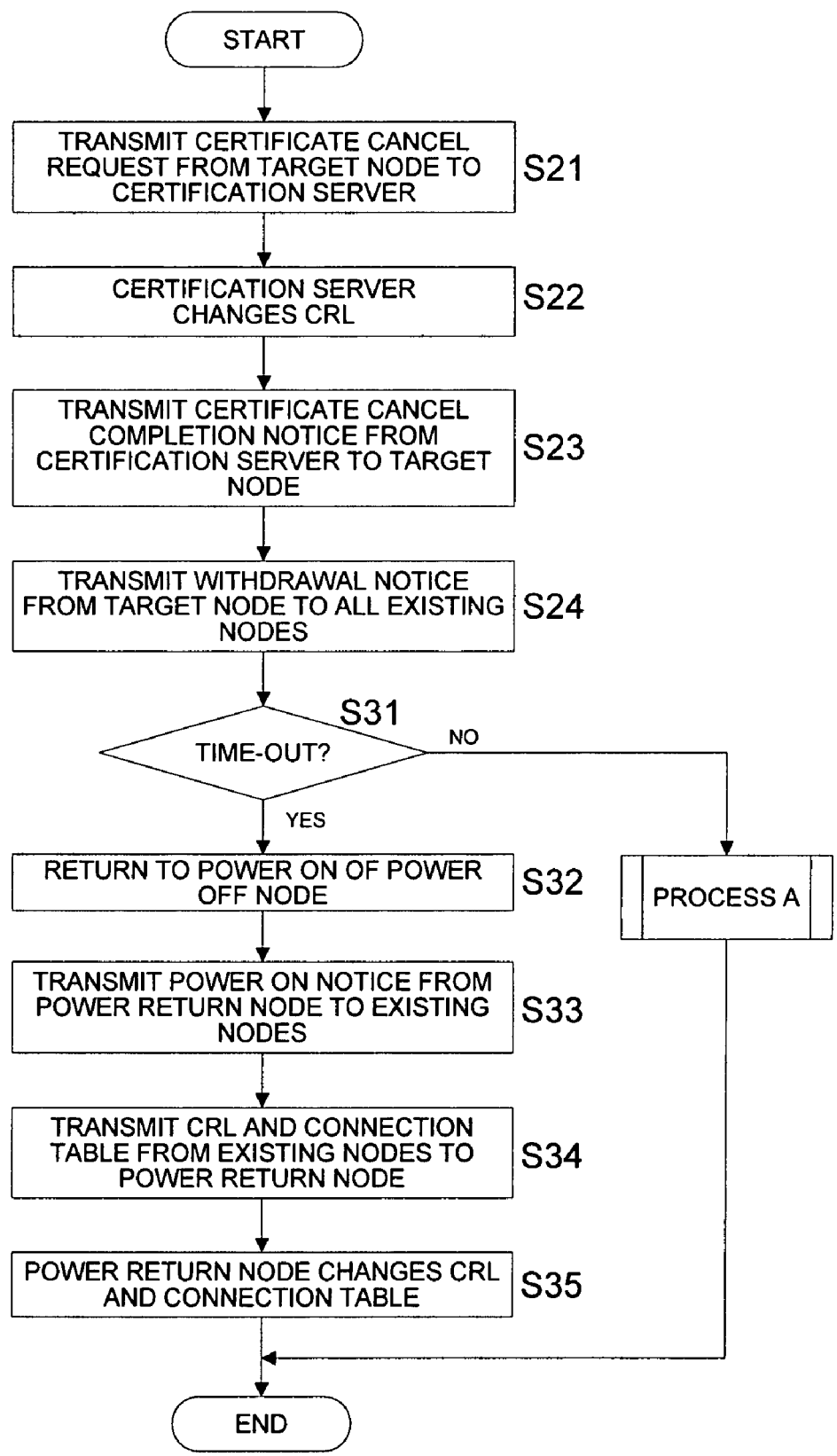
FIG. 11 is a flow chart showing the procedure of the processing example 2 if there is the existing node 2C whose power source is stopped temporarily when the cancel target node 2D withdraws from the network 1.

FIG. 10 is a drawing showing the sequence of the processing example 2 if there is the existing node 2C whose power supply is stopped temporarily when the cancel target node 2D withdraws from the network 1. FIG. 11 is a flow chart similarly showing the procedure of the processing example 2.

By referring to FIGS. 10 and 11, the processing example 2 when there is the existing node 2C which cannot be communicated temporarily will be explained. However, regarding the steps which are the same as those of the processing example 1, the detailed explanation will be omitted.

What relates to the process at the time of withdrawal of the node are the cancel target node 2D to withdraw, certification server 5, and other existing nodes 2A. In FIG. 10, regarding the four kinds of nodes, the processing operation is illustrated according to the sequence thereof. The numerals assigned to the respective processing operations are also the same as the numerals of the corresponding steps of the flowchart shown in FIG. 11.

Firstly, the steps from Step S21 to Step S24 are the same as those of the processing example 1, and the explanation for them will be omitted. Namely, the processes of the cancel target node 2D until issue of the withdrawal notice to all the other existing nodes 2A recorded in the connection table TL held by itself are all the same as those of the processing example 1.

Figure 14:
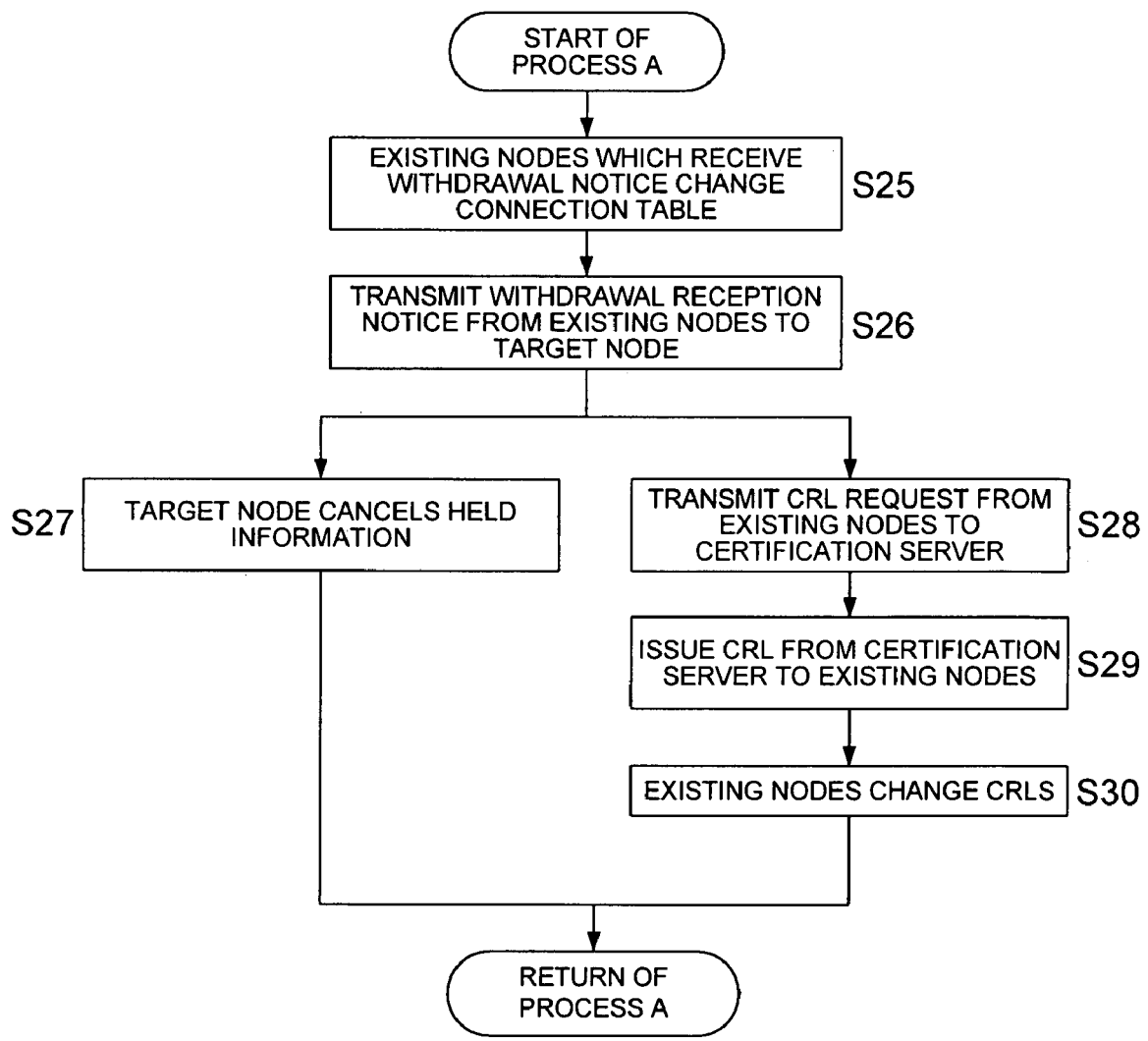
FIG. 14 is a flow chart of a process A.

Then, at Step S31, the process is different between the existing node 2A and the power OFF node 2C. Namely, regarding the existing node 2A receiving the withdrawal notice without time-out, the process goes to the steps of the process A. FIG. 14 shows the flow chart of the process A. The processes from Step S25 to Step S30 shown in FIG. 14 are exactly the same as those from Step S25 to Step S30 of the processing example 1, and the explanation for them will be omitted.

The flow of the process A is a process where on the one hand, even if there is the power OFF node 2C receiving no withdrawal notice, the respective revocation lists CRL are updated independently of the power OFF node 2c, and all the similar processes to the processing example 1 are done.

On the other hand, at Step S31, regarding the node suffering a time-out in reception of the withdrawal notice, that is, the power OFF node 2C, the process goes to Step S32 and the subsequent steps. Namely, Step S32 and following steps are the steps after the point of time when the power OFF node 2C, which cannot be connected temporarily due to stop of the power supply, can be connected to the network.

At Step S32, when the power supply for the power OFF node 2C is returned, then at Step S33, the power source return node 2C is immediately connected to the related existing node 2A and transmits a power ON notice as a return notice.

At Step S34, the existing node 2A receiving the power ON notice transmits the connection table TL and revocation list CRL held by itself to the power return node 2C.

At Step S35, the power return node 2C updates the connection table TL and revocation list CRL held by itself on the basis of the received connection table TL and revocation list CRL of the existing node 2A.

The steps from Step S33 to Step S35 are controlled by the network application unit 206, and the data holding unit 203 is referred to, and the information on revocation is transmitted via the data preparation unit 209 and data transmission unit 210, and the revocation list CRL of the data holding unit 203 is updated by the data operation unit 204.

Therefore, the steps from Step S33 to Step S35 function as a first revocation information supply step.

By use of such a sequence for the time of withdrawal, even if there is the existing node 2C which cannot be connected temporarily due to stop of the power supply at the time when the cancel target node 2D is canceled, it quickly obtains the revocation list CRL and can execute all the communications with the SSL kept being maintained at the point of time when the connection is recovered.

As mentioned above, when the cancel target node 2D withdraws from the network 1, it transmits a withdrawal notice to all the other existing nodes 2A to which it is related. This promotes them to update the connection tables TL and revocation lists CRL held by them, and besides, even if there is the node 2C which cannot be connected temporarily, the revocation lists CRL are provided from the other existing nodes 2A responding to a recovery of connection when the connection is recovered. Thus, there can be avoided a danger of occurrence of unfair connection within the time until the revocation of the cancel target node 2D is reflected on the revocation lists CRL of the other existing nodes 2A and the node 2C.

(Processing Example 3 at the Time of Withdrawal of Node)

An example will be described below as a processing example 3, the example where there is an existing node 2B the connection of which is temporarily out of use, and the communication of which is impossible due to, for example, a defective connection, a trouble or a reason of the network management. The processing example 3, similarly to the processing example 2, takes a measure such as quickly performing a procedure at the point of time when connection can be executed.

Figure 12:
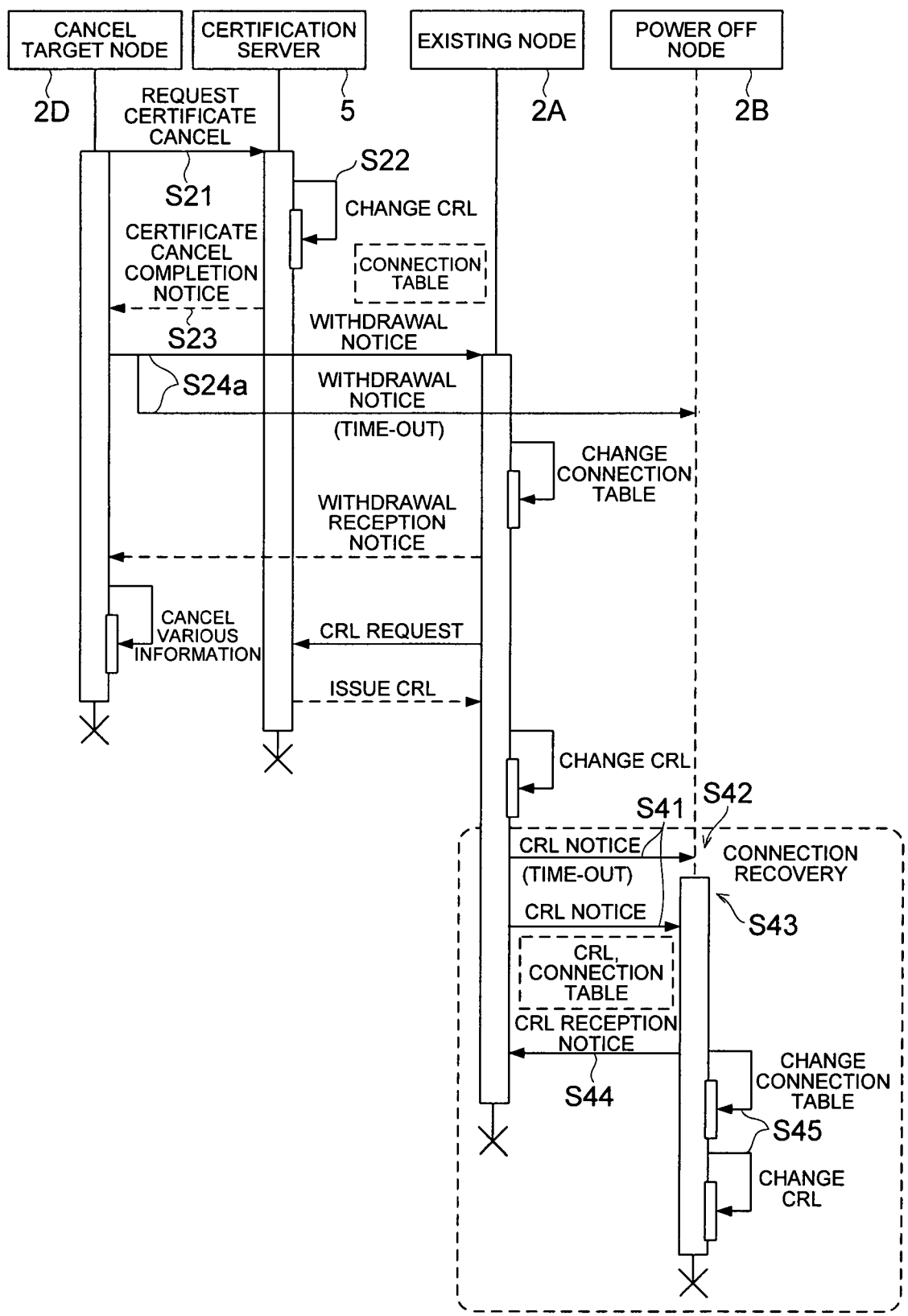
FIG. 12 is a drawing showing the sequence of a processing example 3 if there is an existing node 2B which cannot be connected temporarily when the cancel target node 2D withdraws from the network 1.
Figure 13:
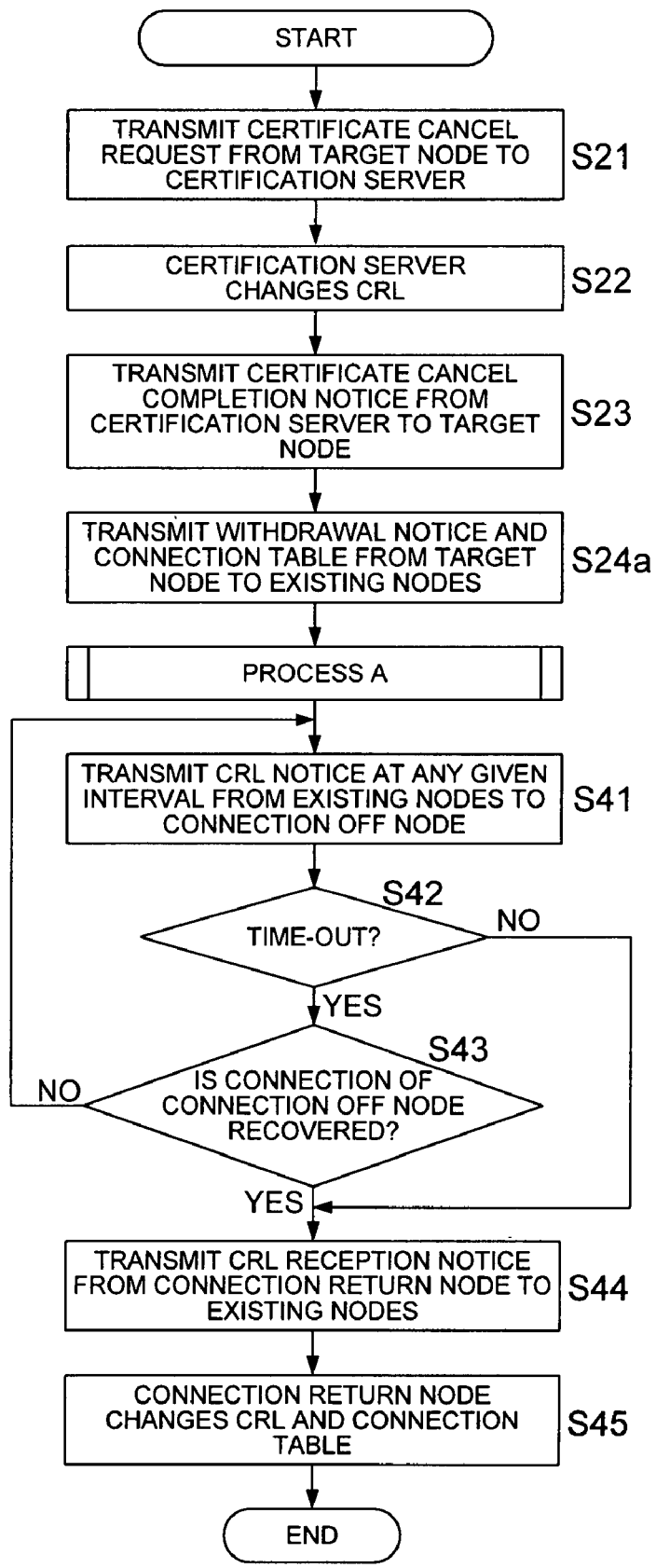
FIG. 13 is a flow chart showing the procedure of the processing example 3 if there is the existing node 2B which cannot be connected temporarily when the cancel target node 2D withdraws from the network 1.

FIG. 12 is a drawing showing the sequence of the processing example 3 if there is the existing node 2B which cannot be connected temporarily when the cancel target node 2D withdraws from the network 1. FIG. 13 is a flow chart similarly showing the procedure of the processing example 3.

By referring to FIGS. 12 and 13, the processing example 3 where there is the existing node 2B which cannot be communicated temporarily will be explained. However, regarding the steps which are the same as those of the processing example 1, the detailed explanation will be omitted.

What relates to the process at the time of withdrawal of the node are the cancel target node 2D to withdraw, certification server 5, other existing nodes 2A, and connection OFF node 2B. In FIG. 12, regarding the four kinds of nodes, the processing operation is illustrated according to the sequence thereof. The numerals assigned to the respective processing operations are also the same as the numerals of the corresponding steps of the flow chart shown in FIG. 11.

Firstly, the steps from Step S21 to Step S23 are the same as those of the processing example 1 and the explanation for them will be omitted. However, Step S24a is slightly different from Step S24 of the processing example 1. Namely, at Step S24a, the cancel target node 2D transfers the withdrawal notice to all the other existing nodes 2A recorded in the connection table TL held by itself and also transmits the connection table TL held by itself. The destination of transmission may be a part of the existing nodes 2A. This is for enabling the existing nodes 2A which received them to transmit a CRL notice to the connection OFF node 2B as described later.

Then, the process goes to the steps of the process A. FIG. 14 shows the flow chart of the process A. The processes from Step S25 to Step S30 shown in FIG. 14 are exactly the same as those from Step S25 to Step S30 of the processing example 1 and the explanation for them will be omitted.

The flow of the process A is a process where even if there is the power OFF node 2C receiving no withdrawal notice on the one hand, the respective revocation lists CRL are updated in advance, and all the similar processes to the processing example 1 are done.

Then, at Step S41, the existing node 2A receiving the connection table TL from the cancels target node 2D transmit the CRT notice at any given interval. The object is to transmit it to the connection OFF node 2B, and the transmission destination is selected on the basis of the connection table TL of the cancel target node 2D received at Step S24a.

In the CRL notice, the revocation list CRL and connection table TL are included. However, before the connection of the connection OFF node 2B returns, a time-out occurs. Therefore, until it is received, the existing nodes 2A continue transmission periodically.

When a time-out occurs at Steps S42 and S43 and the connection is not returned, the process returns to Step S41 and the existing nodes 2A continue the transmission of the CRL notice at any given interval.

When the time-out is eliminated at Steps S42 and S43 and the connection returns, it is assumed that the CRL notice is received by the connection return node 2B, thus the process goes to Step S44. Namely, Step S44 and following steps are the flow after the point of time when the connection OFF node 2B temporarily unconnectible returns to the network and receives the CRL notice.

At Step S44, the connection return node 2B receiving the CRL notice, that is, the revocation lists CRL and connection tables TL from the existing node 2A transmits a reception notice to the existing node 2A which transmits the CRL notice. On the basis of it, the existing node 2A stops the CRL notice transmission at an optional interval.

At Step S45, the connection return node 2B, on the basis of the received connection table TL and revocation list CRL of the existing node 2A, updates the connection table TL and revocation list CRL held by itself.

The steps from Step S41 to Step S45 are controlled by the network application unit 206, and the data holding unit 203 is referred to, and the information on revocation is transmitted via the data preparation unit 209 and data transmission unit 210, and the revocation list CRL of the data holding unit 203 is updated by the data operation unit 204.

Therefore, the steps from Step S41 to Step S45 function as a second revocation information supply step.

By use of the aforementioned sequence, at the time when the cancel target node 2D is canceled, even if there is the existing node 2B which cannot be connected temporarily due to circuit defects, at the point of time when the connection is recovered, it quickly obtains the revocation list CRL and can execute all the communications with the SSL kept held.

As mentioned above, when the cancel target node 2D withdraws from the network 1, it transmits a withdrawal notice to all the other existing nodes 2A to which it is related. This promotes them to update the connection tables TL and revocation lists CRL held by them, and besides, the transmission of the CRL notice from the other existing nodes 2A is continued so as for the CRL notice to be obtained even if there is the node 2B which cannot be connected temporarily. Thus, there can be avoided a danger of occurrence of unfair connection within the time until the revocation of the cancel target node 2D is reflected on the revocation lists CRL of the other existing nodes 2A and the node 2B.

(Processing Example 1b at the Time of Withdrawal of Node)

As a modification of the processing example 1 which is described previously by referring to FIGS. 8 and 9 when the cancel target node 2D withdraws from the network 1, a different processing example 1b will be explained.

Figure 15:
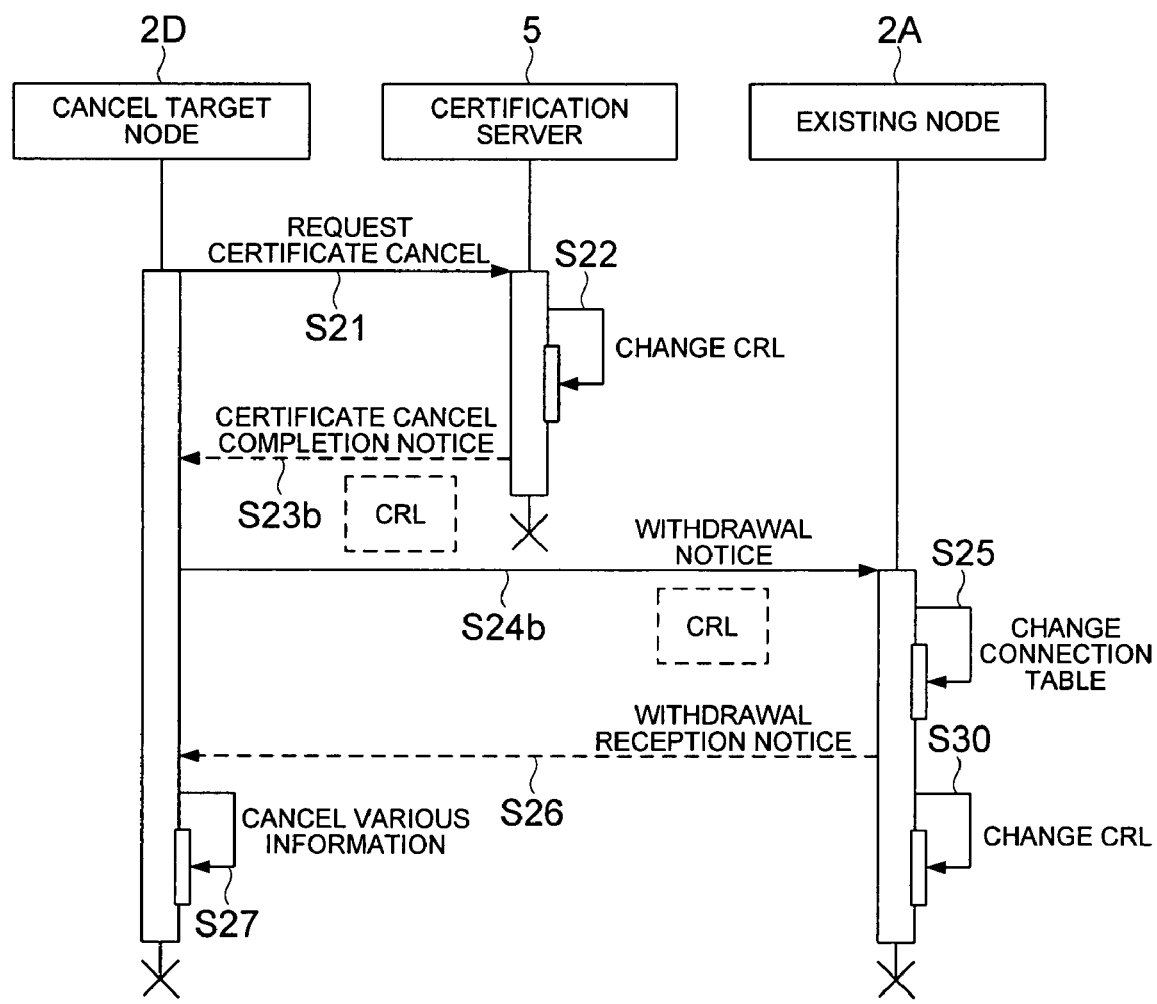
FIG. 15 is a drawing showing the sequence of a processing example 1b when the cancel target node 2D withdraws from the network 1.
Figure 16:
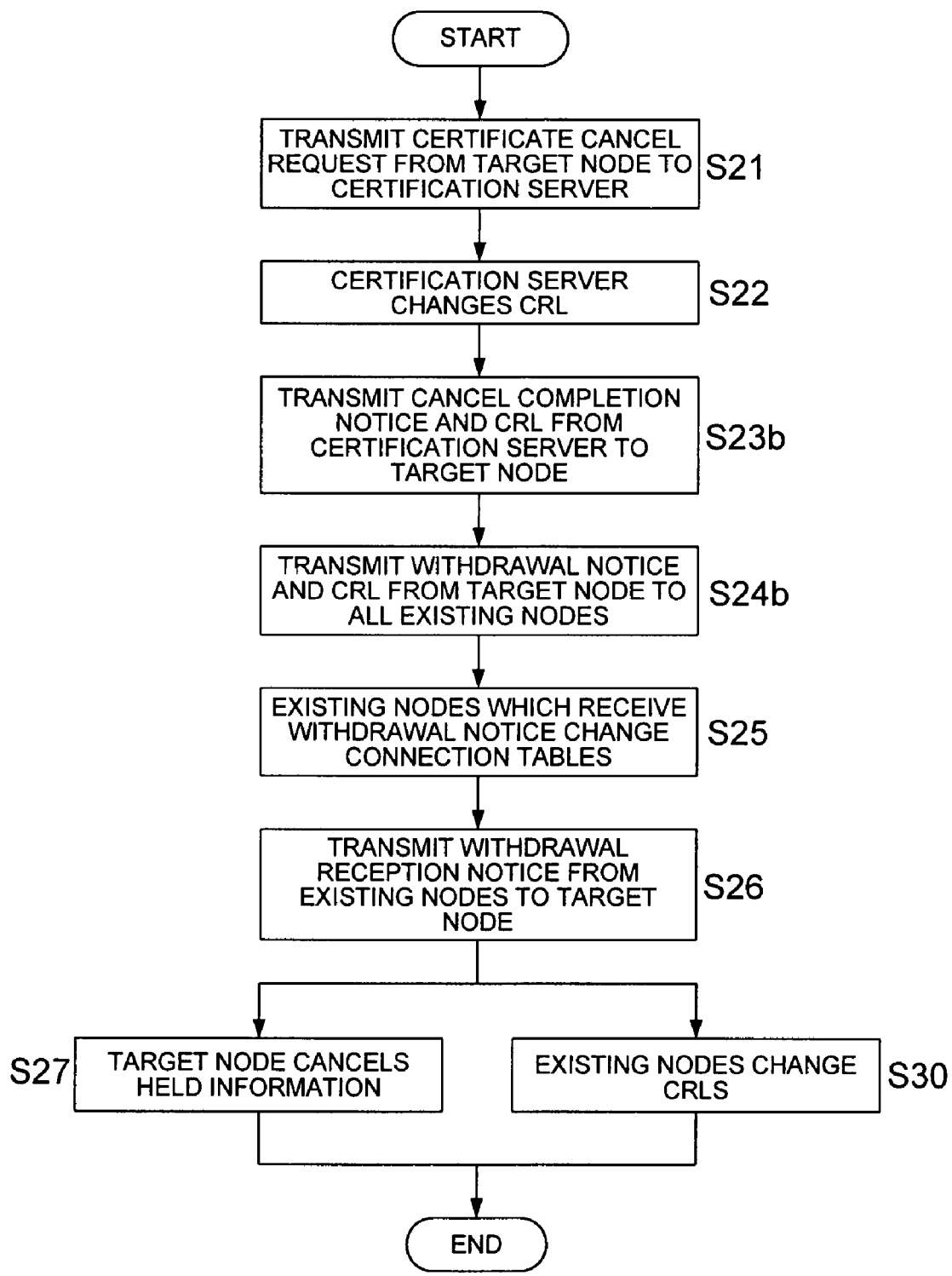
FIG. 16 is a flow chart showing the procedure of the processing example 1b when the cancel target node 2D withdraws from the network 1.

FIG. 15 is a drawing showing the sequence of the different processing example 1b which is a modification of the processing example 1 when the cancel target node 2D withdraws from the network 1. FIG. 16 is a flow chart similarly showing the procedure of the processing example 1b when the cancel target node 2D withdraws from the network 1. By referring to FIGS. 15 and 16, the processing example 1b where the cancel target node 2D withdraws from the network 1 will be explained.

What is relates to the process at the time of withdrawal of the node are the cancel target node 2D to withdraw, certification server 5, and other existing nodes 2A. In FIG. 15, regarding the three kinds of nodes, the processing operation is illustrated according to the sequence thereof. The numerals assigned to the respective processing operations are the same as the numerals of the corresponding steps of the flow chart shown in FIG. 16. In the following explanation for each step shown in FIGS. 15 and 16, when a process operation is similar to that of the processing example 1, the explanation for that will be omitted and the different points will be explained mainly.

Firstly, Steps S21 and S22 are the same as those of the processing example 1 and the explanation for them will be omitted.

Next, Step S23b is slightly different from Step S23 of the processing example 1, and the certification server 5 transmits a certificate cancel completion notice to the canceled not 2D and also transmits the updated certificate revocation list (CRL) after updating of the certificate revocation list (CRL). As the connection for the SSL communication is established at its beginning, no obstacles are caused to the transmission of the certificate cancel completion notice even if the certificate revocation list (CRL) is changed during transportation.

Step S24b is also different from Step S24 of the processing example 1, and the cancel target node 2D, upon receipt of the certificate cancel completion notice, transmits the withdrawal notice to all the other existing nodes 2A recorded in the connection table TL held by itself and also distributes the revocation list CRL in which its own certificate is revoked. Further, a case that no revocation list CRL is distributed may be also considered. In this case, as described later, the process at Step S30 is made different.

As mentioned above, the steps from Step S21 to Step S24b function as a withdrawal notification step.

Steps S25 and S26 are the same as those of the processing example 1 and the explanation for them will be omitted.

Step S27 is also the same as that of the processing example 1. The cancel target node 2D waits for a response for a predetermined period of time and then cancels all the predetermined information held by it.

If there are existing nodes which cannot be communicated temporarily, a measure for quickly performing a procedure is necessary at the point of time when they get to be able to be communicated, and in such a case, the processing examples 2 and 3 aforementioned can be applied similarly to the case of the processing example 1.

The process of issuing the CRL request at Steps S28 and S29 of the processing example 1 and the process of the latest revocation list (CRL) are not necessary in the processing example 1b. The reason is that the revocation list is distributed already at Step S24b.

At Step S30, the existing nodes 2A update the revocation list CRL held in the data holding unit 203 thereof on the basis of the withdrawal notice at Step S24b and the received revocation list CRL. Or, when the revocation list CRL is not distributed at Step S24b, the existing nodes 2D may receive the withdrawal notice and perform a process of directly rewriting the revocation list CRL held by itself. In this case, it is not a updating on the basis of the revocation list (CRL) signed by the certification server 5, so that it is desirable that the updating is complemented by a process such as execution of a periodic confirmation operation.

Step S30 is controlled by the network application unit 206, and the revocation list CRL of the data holding unit 203 is updated by the data operation unit 204.

As mentioned above, Step S30 functions as a revocation information change step.

By use of the aforementioned sequence for the time of withdrawal, just at the time when the cancel target node 2D is canceled, the other existing nodes 2A quickly update the revocation lists CRL and can execute all the communications with the SSL kept being maintained.

As mentioned above, when the cancel target node 2D withdraws from the network 1, it transmits a withdrawal notice to all the other existing nodes 2A to which it is related and promotes them to update the connection tables TL and revocation lists CRL held by them, thus there can be avoided a danger of occurrence of unfair connection within the time until the revocation of the cancel target node 2D is reflected on the revocation lists CRL of the other existing nodes 2A.

According to the embodiment of the present invention, in a network composed of a plurality of nodes wherein the nodes verify mutually and can communicate directly each other, when a certificate is revoked due to withdrawal of a node, the revoking node transmits a withdrawal notice to all the other existing nodes which can be connected directly and promotes them to update the connection tables and revocation lists held by them, thus the information on the revocation of the certificate can be reflected immediately on the revocation lists CRL of the other existing nodes.

By doing this, a managing method for information on revocation of a certificate in the network aforementioned capable of suppressing a danger of unfair connection within the time until the CRLs are updated, and an information processing apparatus as a node composing the network can be provided.

Further, the scope of the present invention is not limited to the aforementioned embodiment. As long as an embodiment does not depart from the spirit, the modifications thereof are included in the scope thereof.

What is claimed is:

1. A method for managing a network, the method comprising the steps of:
    providing a first node with a digital certificate from a certificate authority;
    providing a second node with a certificate revocation list from the certificate authority, the list being used for confirming a revoked digital certificate;
    sending the digital certificate from the first node to the second node when a communication is conducted between the first node and the second node;
    verifying the digital certificate received from the first node by the second node by using the certificate revocation list and refusing the communication when the received digital certificate is indicated as a revoked digital certificate by the certificate revocation list; and
    causing the first node to notify the certificate authority and the second node of withdrawal of the first node from the network in order to update the certificate revocation list when the first node withdraws from the network;
    causing the second node to request and obtain the certificate revocation list from the certificate authority when the second node has received from the first node the notice of the withdrawal of the first node; and
    updating the certificate revocation list based on the obtained information about the digital certificate of the first node.

2. A method for managing a network, comprising the steps of:
    providing a first node with a digital certificate from a certificate authority;
    providing a second node with a certificate revocation list from the certificate authority, the list being used for confirming a revoked digital certificate;
    sending the digital certificate from the first node to the second node when a communication is conducted between the first node and the second node;
    verifying the digital certificate received from the first node by the second node by using the certificate revocation list and refusing the communication when the received digital certificate is indicated as a revoked digital certificate by the certificate revocation list;
    causing, when the first node withdraws from the network, the first node to notify_the certificate authority and the second node of withdrawal of the first node from the network, and to send to the second node information about revocation of the digital certificate of the first node; and
    causing the second node to update the certificate revocation list held by the second node based on the information which is about revocation of the digital certificate and is sent from the first node.

3. A method of managing a network, comprising the steps of:
    providing a first node with a digital certificate from a certificate authority;
    providing a second node with a certificate revocation list from the certificate authority, the list being used for confirming a revoked digital certificate;
    sending the digital certificate from the first node to the second node when a communication is conducted between the first node and the second node;
    verifying the digital certificate received from the first node by the second node by using the certificate revocation list and refusing the communication when the received digital certificate is indicated as a revoked digital certificate by the certificate revocation list;
    notifying the certificate authority and the second node of withdrawal of the first node from the network in order to update the certificate revocation list when the first node withdraws from the network;
    notifying a third node other than the second node of the withdrawal of the first node if a communication with the second node is impossible when the first node withdraws from the network; and
    notifying the second node of the withdrawal of the first node by the third node when the third node gets to be able to communicate with the second node.

4. The method of claim 3, further comprising the step of:
    notifying the second node of the withdrawal of the first node by the third node on receiving a returning notice from the second node, said returning notice being issued by the second node when the second node returns to the network.

5. The method of claim 3, further comprising the step of:
    sending the withdrawal of the first node to the second node on a regular basis by the third node until the third node gets to be able to communicate with the second node.

* * * * *